United States Patent [19]

Segrest

[11] Patent Number: 5,397,825
[45] Date of Patent: Mar. 14, 1995

[54] RUBBER RECYCLING PROCESS AND PRODUCT

[76] Inventor: Neal Segrest, 22719 Aldine Westfield, Spring, Tex. 77373

[21] Appl. No.: 64,231

[22] Filed: May 19, 1993

[51] Int. Cl.$^6$ .............................. C08J 7/02; C08L 9/06
[52] U.S. Cl. .................... 524/270; 524/274; 524/280; 524/290; 524/322; 521/41; 521/42; 521/43.5; 521/44.5
[58] Field of Search ............... 524/270, 274, 280, 290, 524/322; 521/43.5, 41, 42, 44.5

[56] References Cited

U.S. PATENT DOCUMENTS

| | | | |
|---|---|---|---|
| 2,423,033 | 6/1947 | Rée Vilma le Beau | 521/43.5 |
| 4,025,990 | 5/1977 | Lovette, Jr. | 241/14 |
| 4,049,588 | 9/1977 | Lee et al. | 521/44.5 |
| 4,244,841 | 1/1981 | Frankland | 521/43.5 |
| 4,579,871 | 4/1986 | Linden et al. | 521/41 |

Primary Examiner—Paul R. Michl
Assistant Examiner—Olga Asinovsky
Attorney, Agent, or Firm—Bernard A. Reiter & Associates

[57] ABSTRACT

An active filler composition utilizing scrap rubber, such as automobile tires, as a main or primary ingredient is used in the treatment, recycling, and manufacture of various rubber and plastic articles. A chemical plasticizer and binding agent is used in the production of the composition to plasticize, swell, and soften the scrap rubber. The filler composition is a homogeneous blend of from about 40 to 95 parts by weight of cured rubber particles and from about 5 to 60 parts by weight of the liquid plasticizer and binder. The active filler composition can be further compounded with materials such as polyethylene, polyethylene-terephthallate (PET), polyurethanes, urethanes, polyisocurates, polyacrylics, polyvinylchloride (PVC), and epoxies, to form a composite material for combining with still other materials to impart elastomeric properties. The product and process are particularly suitable for use with cryogenically produced rubber and provides an efficient method for recycling scrap rubber tires and converting them into useful commercial products.

14 Claims, No Drawings

RUBBER RECYCLING PROCESS AND PRODUCT

BACKGROUND OF THE INVENTION

1. Field of the Invention

This invention relates generally to rubber recycling processes, and more particularly to a rubber recycling process utilizing a chemical plasticizer and binding agent which is blended with scrap rubber, such as automobile tires, to produce an active filler composition which can be further compounded with other materials to form a composite material for combining with still other materials in the treatment, recycling, and manufacture of rubber and plastic articles.

2. Brief Description of the Prior Art

The slow biodegradable nature and increasing quantities of cured rubber articles, such as rubber tires, and cured plastic articles, such as polyethylene, polyvinylchloride, and other non-biodegradable articles, has caused worldwide concern for the environment, and many companies are making efforts to recycle these types of products. Current attempts to reclaim and reuse these articles in commercial ventures range from burning finely ground rubber, revulcanizing ground rubber, and reprocessing polyethylene. The success of these ventures depends upon the cost to render the materials reusable.

Various processes have been used for recycling waste tires into other forms for commercially use as an additive or filler for use in such things as asphalt and road paving materials. Large volumes of tall oil have been tried as a glue for ground scrap articles. Kahl Corporation has used a proprietary tall oil blend on ground tire waste as a part of a vulcanized package. Small amounts of scrap rubber may be added to virgin rubber as a filler in tire manufacturing. However, it is not cost effective since large amounts cannot be used because the curing process does not take place on a molecular level and the finished product cannot meet the new tire standards. Virgin cured rubber is usually priced lower than reclaimed rubber and has better physical properties in compounding.

Discarded tires are still not widely used in industry in molding rubber articles because of the cost of treating the scrap materials to make them acceptable for use. Similarly, there are problems associated in recycling of plastic articles such as polyethylene and polyvinlychloride (PVC) and other plastic materials. For example, the molecular weight mixing range of polyethylene has caused problems with homogeneity and performance of the finished product and, in the case of PVC, there is an environmental stigma associated with vinyl chloride.

There are several patents which disclose various processes and methods for reclaiming rubber waste.

Terhune, U.S. Pat. No. 1,450,462 discloses a method for reclaiming rubber waste which includes tearing up the waste to expose the fiber and permitting the fiber to absorb sulfuric acid.

Cude, U.S. Pat. No. 1,680,862 discloses a method for treating rubber which includes comminuting the rubber and treating it to organic acid capable of forming a water soluble soap.

Green, U.S. Pat. No. 2,879,245 discloses a tire scrap treatment method which includes reacting a rubbery polymer with a material selected from a group which includes carboxylic acids and esters of carboxylic acids.

Bunk et al, U.S. Pat. Nos. 3,652,467 and 3,681,267 disclose an adhesive composition comprising reclaim rubber and a rosin pot residue which includes dimeric monobasic acids and rosin.

Allen et al, U.S. Pat. No. 3,801,421 discloses an athletic surfacing laminate which includes a layer comprising particulate vulcanized rubber bonded with a resin.

Lee et al, U.S. Pat. No. 4,049,588 discloses a method for treating vulcanized rubber which includes contacting the vulcanized rubber with a fatty acid.

Frankland, U.S. Pat. No. 4,244,841 discloses a method for recycling rubber scrap which includes admixing the rubber with a cure mix which includes zinc stearate.

Many rubber recycling processes abrasively grind up waste rubber to form small particles. Abrasively ground rubber particles are generally flat with an irregular surface.

Other rubber recycling processes use waste rubber "buffings" which are powder-like particles produced during tire recapping operations. The rubber is skired from the tire in string-like configurations and is ground up to produce small particles. The rubber "buffings" or tire "buffings" usually do not contain steel belt or cord material from the tire. Emery buffings, or "buff rubber" has been the most widely used type of particle because of its string-like structure and low to nonexistent level of cord and steel belt materials. Untreated emery buffings are relatively soft and tend to bond better than particles produced by other methods.

The articles produced from ground rubber or buff rubber are relatively expensive due to the cost of grinding and further processing of the scrap rubber.

Some processes utilize cryogenically produced rubber particles in which the rubber is cooled in liquid nitrogen and then pulverized. The cryogenically produced rubber particles, or "cryo" rubber particles, are angular, have low surface area, and are shaped much like a jagged rock. Cryogenically produced rubber particles can be produced somewhat more economically than particles produced by other methods at ambient temperatures, but the cryo rubber particles are harder, have more abrasive resistance, and poor bonding strength. Thus, cryogenically produced rubber particles have had limited use in recycling processes.

It would therefore be desirable to utilize scrap rubber, such as automobile tires, as a main or primary ingredient in a chemical composition which can be used as an active filler in the treatment, recycling, and manufacture of rubber and plastic articles. It would also be desirable to provide a chemical plasticizer and binding agent which will plasticize, swell, and soften scrap rubber including cryogenically produced rubber.

SUMMARY OF THE INVENTION

It is therefore an object of the present invention to provide a process for reclaiming and recycling scrap rubber and plastic articles.

It is another object of this invention is to provide a chemical plasticizer and binding agent which will plasticize, swell, and soften scrap rubber including cryogenically produced rubber.

Another object of this invention to provide an active filler utilizing scrap rubber, such as automobile tires, as a main or primary ingredient which can be used as an active filler in the treatment, recycling, and manufacture of rubber and plastic articles.

Another object of this invention is to provide a homogeneous active filler composition which can be compounded with various scrap materials such as polyethylene, polyethyleneterephthallate (PET), polyurethanes, urethanes, polyisocurates, polyacrylics, polyvinylchloride (PVC), and epoxies, to form a composite material for combining with still other materials to impart elastomeric properties.

A further object of this invention is to provide a chemical plasticizer and binding agent which is particularly suited to plasticize, swell, and soften cryogenically produced scrap rubber to produce an active filler which may be price competitive with virgin rubber.

A still further object of this invention is to provide an inexpensive method of recycling scrap rubber tires and converting them into useful commercial products.

Other objects of the invention will become apparent from time to time throughout the specification and claims as hereinafter related.

The present invention relates to an active filler composition utilizing scrap rubber, such as automobile tires, as a main or primary ingredient which can be used in the treatment, recycling, and manufacture of various rubber and plastic articles. The invention also relates to a chemical plasticizer and binding agent which is used in the production of the composition to plasticize, swell, and soften the scrap rubber including cryogenically produced rubber. The invention further relates to a method of recycling scrap rubber tires and converting them into useful commercial products.

The active filler composition, briefly, comprises a homogeneous blend of from about 40 to 95 parts by weight of cured rubber particles and from about 5 to 60 parts by weight of a liquid compound selected from the group of ingredients consisting of; rosin acids, fatty acids, dimerized fatty acids, trimerized fatty acids, esters, sterols, neutrals, and unsaponifiables. The liquid compound and rubber particles are mixed together to swell and plasticize the rubber particles and form a homogeneous active filler composition for combining with other materials to impart elastomeric properties.

The active filler composition thus formed can be further compounded with materials selected from the group consisting of polyethylene, polyethylene-terephthallate (PET), polyurethanes, urethanes, polyisocurates, polyacrylics, polyvinylchloride (PVC), and epoxies, to form a composite material for combining with still other materials to impart elastomeric properties.

DESCRIPTION OF THE PREFERRED EMBODIMENT

In the description below and as used throughout the specification and claims, the terms "esters" "sterols" "neutrals", and "unsaponifiables" are defined as follows: "Esters" are organic compounds formed by reaction between an acid and an alcohol with the elimination of a molecule of water; "sterols" are any of a group of solid, mostly unsaturated, polycyclic alcohols derived from plants or animals; "neutrals" are substances which exhibit neither acid nor alkaline qualities; "unsaponifiables" are substances found in the residue resulting from the reaction of esters with alkalis to give alcohols and salts of carboxylic acids.

The cured scrap rubber particles used in the present invention are of natural or synthetic rubber or a combination thereof, such as automobile tires. The tire is first cut into small pieces and the pieces are comminuted into particles by various methods. The particles may be waste rubber buffings produced during tire recapping operations, or may be produced by abrasive grinding, or by cryogenically methods. The abrasively ground rubber particles and rubber buffings usually contain very little or no steel belt or cord material from the tire. However, depending upon the particular application, it is not a necessary for the particles to be free of steel belt, cord material, or carbon black, and in some instances these elements may be desirable.

The preferred method of producing the rubber particles is cryogenically wherein the scrap rubber pieces are subjected to liquid nitrogen to lower the temperature of the scrap rubber below its glass transition temperature and are then shattered into particles by crushing it, milling it, or shooting the frozen pieces at a stationary target. The cryogenically produced rubber particles, or "cryo" rubber particles, are angular, have low surface area, and are shaped much like a jagged rock. The cryogenically produced rubber particles are harder and have more abrasive resistance than particles produced by other methods.

Heretofore, the cryogenically produced particles have had limited use in recycling processes because of their poor bonding qualities. However, the plasticizing and binding agent of the present invention (described hereinafter) overcomes these problems and renders the cryo rubber particles suitable for use in many applications. The cryogenic method is a very efficient and cost effective method for separating rubber from scrap tire casings.

Regardless of the method of procuring the rubber particles, the scrap rubber particles are classified by size for various uses corresponding to the finished product to be produced. Cryogenically produced crumb rubber with the average size being less than 40 mesh (U.S. Sieve series) or ambiently ground crumb rubber with the average size being less than 80 mesh is used in some applications. Tire buffings may be several inches long and a small as −400 mesh in size. Treated tire buffings have been used in ambient cure urethanes for: Floor padding systems, asphalt modifiers (10–100 mesh), plastic applications (30–400 mesh), composites (100–300 mesh), and paints and coatings (30–400 mesh).

After being classified, the scrap rubber particles are dried to reduce the moisture content. The preferred drying method is subjecting the particles to hot air having a temperature of about 150° C. to 160° C. over a predetermined period of time. In most applications, the preferred moisture content for the rubber particles is less than about 1.0% moisture by weight. The moisture content of cryogenically produced crumb rubber of less than 40 mesh can be reduced to about 1.0% in approximately 2 hours and ambiently ground crumb rubber of less than 40 mesh can be reduced to less than 0.2% in this same length of time.

After the scrap rubber particles have been classified and dried, the chemical plasticizer and binding agent is applied. The chemical plasticizer and binding agent is a liquid compound which utilizes a mixture selected from the group of ingredients consisting of; rosin acids, fatty acids, dimerized fatty acids, trimerized fatty acids, esters, sterols, neutrals, and unsaponifiables. The liquid compound and rubber particles are mixed together to swell and plasticize the rubber particles and form the homogeneous active filler composition. The preferred chemical formulation for the plasticizer and binding agent is shown below:

| INGREDIENT | WEIGHT % |
| --- | --- |
| rosin acids | 0–50% |
| fatty acids | 0–50% |
| esters | 0–50% |
| dimerized acids | 0–90% |
| trimerized acids | 0–60% |
| neutrals | 0–20% |
| unsaponifiables | 0–20% |

Any member from the selected family of rosin acids, fatty acids, dimerized acids, trimerized acids, esters, sterols, neutrals, and unsuponifiables may be used in the formulation of the plasticizer and binding agent, and a specific member of each group is not critical to the formulation. Depending upon the source of supply, some of the acids and esters may contain neutrals and unsuponifiables, and others may not. Also, depending upon the particular application of the resultant homogeneous active filler, some formulations of the plasticizer and binding agent used to produce the filler may contain a member from all of the listed ingredients and some may contain only a few. For example, one may use only a combination of dimerized and trimerized acids, and another may use a different combination.

For all water sensitive applications, the plasticizer and binding agent should be applied at a point where the moisture content in the scrap rubber particles is below 1.0% and some applications, such as polyethylene extrusion, require less than 0.5% moisture. In this instance, water expands many times with the heat and pressure and causes blistering in the polyethylene. The water also affects bonding characteristics between the plastic and rubber.

The preferred active filler composition is a homogeneous blend of from about 40 to 95 parts by weight of cured rubber particles having a moisture content of less than 5% (but not limited thereto) and from about 5 to 60 parts by weight of the liquid plasticizer and binder.

The plasticizer and binding agent compound is applied to the scrap rubber particles by first heating it to a temperature of about 130° C. to 150° C. and then combining it with the rubber particles until the desired ratio of plasticizer to rubber particles is achieved. The plasticizer and binding agent may be applied and blended with the rubber particles by various methods, such as placing the rubber particles into a ribbon blender and spraying them with the heated plasticizer and binding agent while constantly stirring them in the blender until the desired ratio is achieved. The resulting composition is an active filler composition which can be further compounded with other materials to form a composite material for combining with still other materials to impart elastomeric properties and beneficial characteristic.

The treated rubber-particles exhibit a liquid-like flow in a blender and do not tend to stick to each other at room temperature and pressure. The treated particles exhibit a memory of their shape which allows flexibility to be imparted to substances. The active filler composition is also more dispersible in organic media than untreated rubber.

The homogeneous active filler composition can be compounded with materials such as; polyethylene, polyethyleneterephthallate (PET), polyurethanes, urethanes, polyisocurates, polyacrylics, polyvinylchloride (PVC), and epoxies.

The plasticizer and binding agent of the present invention is sulfur-curable and conventional sulfur donor agents (sulfur and/or zinc) can be also used with the treated rubber particles or the treated rubber particles can be used without the sulfur cure package in all applications except revulcanization.

Another feature of the active filler composition is that it has increased absorptivity. The swollen and softened rubber will absorb many times the level of liquid products that it would prior to treatment. This allows the material to carry processing and compounding aids and to be used in blending and compounding situations as a liquid-filled material. This is in large part due to the amount of carbon-black filler in tires. The carbon-black seems to be able to carry much more liquid if the rubber is treated in a dry state versus a moist state. Examples of some agents that can be blended into the treated rubber are; PVC plasticizers, cure packages, and polyethylene lubricants.

As an active filler, the treated rubber imparts elastomeric properties to the products they are placed into. The also act as impact modifiers and help to improve the modulus, elongation, tensile strength, and helps to blend out crystalline spots in various high molecular weight polymers. The treated particles act as processing aids in polyethylene and other polymeric reclamation by homogenizing varieties of molecular weight polymers together, imparting beneficial properties that even virgin polymers do not posses. The plasticizer and binding agent of the present invention opens up new areas of use for cryogenically produced scrap rubber particles. For example, the "cryo" rubber particles can be used in asphalt, plastics, coatings, and even paint applications not feasible prior to treatment.

The active filler produced by the present invention can be used in various proportions as a binder or filler in the manufacture or recycling of various other products as shown below:

| PRODUCT | WEIGHT % |
| --- | --- |
| asphalt | 12–30% |
| thermoflow plastics | 10–50% |
| urethane bonded pads | 60–90% |
| coatings | 03–80% |
| composite plastics | 10–70% |

The following are examples of tests which were carried on various treated rubber particles and illustrate a comparison of untreated rubber particles and rubber particles treated with the present plasticizer and binding agent.

EXAMPLE 1

Cryogenically produced crumb rubber with the average size being less than 40 mesh by screen method was dried at 160° C. with hot air for 2 hours. The moisture content was found to be less than 1.0% moisture by weight. The chemical blend was sprayed on at a temperature of 150° C. with constant stirring in a ribbon blender until 10% by weight was added to the rubber. This surface treated material was then compounded with finely ground polyethylene-terephthallate (PET) recovered from plastic soda bottles in a 30% rubber–70% PET ratio. The resultant material was then formed into ASTM 1/16" strips and subjected to the testing shown. The combined product was found to be paintable whereas the PET alone was not.

|                   | PET            | PET + TREATED RUBBER |
| ----------------- | -------------- | -------------------- |
| specific gravity  | 0.955          | 1.12                 |
| hardness          | 60 (DSA)       | 84 (DSA)             |
| tensile strength  | 460 psi        | 780 psi              |
| elongation        | 85%            | 200%                 |
| melt index        | 22 gms/10 min. | 145 gms/10 min.      |
| Test Conditions:  |                |                      |
| temperature 190° C. |              |                      |
| orifice dia .0825" |               |                      |
| weight 21.65 kg.  |                |                      |

EXAMPLE 2

Ambiently ground crumb rubber with the average size being less than 40 mesh by screen method was dried at 160° C. with hot air for 2 hours. The moisture content was found to be less than 0.2% moisture by weight. The chemical blend was sprayed on at a temperature of 130° C. with constant stirring in a ribbon blender until 10% by weight was added to the rubber. Swelling and softening of the rubber was noted. The treated material was then compounded with finely ground medium density polyethylene (PE) in a 50% rubber–50% PE ratio. The resultant material was then formed into 40 mil sheets and subjected to the testing shown. The resulting material was found to be suitable for use in making underground liners.

|                    | PE       | PE + TREATED RUBBER |
| ------------------ | -------- | ------------------- |
| density g/cc (min) | 0.9340   | 1.10                |
| hardness           | 60 (DSA) | 84 (DSA)            |
| tensile strength   | 200 psi  | 280 psi             |
| elongation         | 700%     | 930%                |
| tear resistance    | 30 lbs.  | 40 lbs.             |
| puncture resistance | 52 lbs. | 64 lbs.             |

EXAMPLE 3

Ambiently ground crumb rubber with the average size being less than 80 mesh by screen method was dried at 160° C. with hot air for 2 hours. The moisture content was found to be less than 0.2% moisture by weight. The chemical blend was sprayed on at a temperature of 130° C. with constant stirring in a ribbon blender until 10% by weight was added to the rubber. Swelling and softening of the rubber was noted. The treated material was then blended with finely ground Dupont Nucrel (TM) in a 50% rubber–50% Nucrel ratio. The resultant material blend was then flame sprayed onto test squares of mild steel and aluminum.

The results of example 3 showed that the Nucrel (TM) combined with the treated rubber was easily applied. There was no clumping, as had been experienced with untreated rubber. Coverage was attained at 30 mil without carbon black being present. The surface resistance was increased from 12 lbs. to 38 lbs. The resultant coating was checked for pin holes and found to be a conductive surface.

Other tests have been carried out using ground rubber crumb of less than 80 mesh dried at 160° C. with hot air for 2 hours and having less than 0.2% moisture by weight. The chemical blend was sprayed on at a temperature of 130° C. with constant stirring in a ribbon blender until 10% by weight was added to the rubber with a resultant swelling and softening of the rubber. The treated material has been blended with epoxy coatings, polyurethanes, polyisocurates, polyacrylic coatings, and rebonded into rubber articles and recycled mixed plastics including polyethylene and PVC to make rubber boards and posts.

While this invention has been described fully and completely with special emphasis upon several preferred embodiments, it should be understood that within the scope of the appended claims the invention may be practiced otherwise than as specifically described herein.

I claim:

1. A method of reclaiming rubber waste for reuse as a homogeneous active filler material suitable for use in combination with other materials to impart elastomeric properties comprising the steps of:
   comminuting cured rubber waste into particles;
   drying said rubber particles to substantially reduce the moisture level thereof;
   preparing a liquid chemical plasticizer and binding agent compound selected from the group of ingredients consisting of; rosin acids, fatty acids, dimerized fatty acids, trimerized fatty acids, esters, sterols, neutrals, and unsaponifiables;
   heating said liquid chemical plasticizer and binding agent; and
   blending said heated liquid chemical plasticizer and binding agent with said dried rubber particles to swell and plasticize said rubber particles and yield a homogeneous active filler composition having from about 5 to 60 parts by weight of said liquid chemical plasticizer and binding agent and from about 40 to 95 parts by weight of said rubber particles.

2. The method according to claim 1 in which
   said step of drying said rubber particles to substantially reduce the moisture level thereof includes reducing the moisture level of said rubber particles to less than 1.0%.

3. The method according to claim 1 in which
   said step of substantially reducing the moisture level of said rubber particles includes subjecting them to hot air of predetermined temperature.

4. The method according to claim 1 wherein
   said step of preparing said liquid chemical plasticizer and binding agent compound includes mixing the selected ingredients in a ratio of;
   from 1 to about 50% rosin acids,
   from 1 to about 50% fatty acids,
   from 1 to about 90% dimerized fatty acids,
   from 1 to about 60% trimerized fatty acids,
   from 1 to about 50% esters,
   from 1 to about 20% neutrals, and
   from 1 to about 20% unsaponifiables.

5. The method according to claim 1 including the further step of
   compounding said yielded homogeneous active filler composition with materials selected from the group consisting of polyethylene, polyethyleneterephthallate (PET), polyurethanes, polyisocyanurates, polyacrylics, polyvinylchloride (PVC), and epoxies, to form a composite material for combining with other materials to impart elastomeric properties.

6. The method according to claim 1 wherein
   said step of comminuting cured rubber waste into particles comprises lowering the temperature of said cured rubber waste below its glass transition temperature and then shattering it into particles.

7. The method according to claim 6 wherein
said step of lowering the temperature of said cured rubber waste includes subjecting it to liquid nitrogen.

8. A method of recycling scrap rubber tires to yield a homogeneous active filler material suitable for use in combination with other materials to impart elastomeric properties comprising the steps of:
   comminuting scrap rubber tires into rubber particles;
   drying said rubber particles to substantially reduce the moisture level thereof;
   preparing a liquid chemical plasticizer and binding agent compound selected from the group of ingredients consisting of; rosin acids, fatty acids, dimerized fatty acids, trimerized fatty acids, esters, sterols, neutrals, and unsaponifiables;
   heating said liquid chemical plasticizer and binding agent; and
   blending said heated liquid chemical plasticizer and binding agent with said dried rubber particles to swell and plasticize said rubber particles and yield a homogeneous active filler composition having from about 5 to 60 parts by weight of said liquid chemical plasticizer and binding agent and from about 40 to 95 parts by Weight of said rubber particles.

9. The method according to claim 8 in which
said step of drying said rubber particles to substantially reduce the moisture level thereof includes reducing the moisture level of said rubber particles to less than 1.0%.

10. The method according to claim 8 in which
said step of substantially reducing the moisture level of said rubber particles includes subjecting them to hot air of predetermined temperature.

11. The method according to claim 8 wherein
said step of preparing said liquid chemical plasticizer and binding agent compound includes mixing the selected ingredients in a ratio of;
from 1 to about 50% rosin acids,
from 1 to about 501 % fatty acids,
from 1 to about 90% dimerized fatty acids,
from 1 to about 60% trimerized fatty acids,
from 1 to about 50% esters,
from 1 to about 20% neutrals, and
from 1 to about 20% unsaponifiables.

12. The method according to claim 8 including the further step of
compounding said yielded homogeneous active filler composition with materials selected from the group consisting of polyethylene, polyethyleneterephthallate (PET), polyurethanes, polyisocyanurates, polyacrylics, polyvinylchloride (PVC), and epoxies, to form a composite material for combining with other materials to impart elastomeric properties.

13. The method according to claim 8 wherein
said step of comminuting said scrap rubber tires into rubber particles comprises lowering the temperature of said scrap rubber tire below its glass transition temperature and then shattering it into particles.

14. The method according to claim 13 wherein
said step of lowering the temperature of said cured rubber waste includes,subjecting it to liquid nitrogen.

* * * * *